July 8, 1952  E. C. RANEY  2,602,593
CONTROL VALVE

Filed Oct. 1, 1949  2 SHEETS—SHEET 1

INVENTOR.
ESTEL C. RANEY
BY Hudson, Boughton,
Williams, David & Hoffmann
ATTORNEYS July 8, 1952   E. C. RANEY   2,602,593
CONTROL VALVE Filed Oct. 1, 1949   2 SHEETS—SHEET 2

INVENTOR.
ESTEL C. RANEY
BY Hudson, Boughton,
Williams, David & Hoffmann
ATTORNEYS Patented July 8, 1952

2,602,593

UNITED STATES PATENT OFFICE 2,602,593

CONTROL VALVE

Estel Coler Raney, Delaware, Ohio, assignor to Ranco Incorporated, Columbus, Ohio, a corporation of Ohio Application October 1, 1949, Serial No. 119,144

6 Claims. (Cl. 236—99)

The present invention relates to thermostatically operated control devices and more particularly to a thermostatically operated valve having a manually adjustable mechanism for varying the operating temperatures of the valve.

An object of the present invention is to provide a control device, such as a valve, operated by a thermal responsive element and a spring opposing the thermal element, and having new and improved mechanism for manually adjusting the spring tension to vary the valve operating temperatures, and which mechanism is operative to move and hold the valve in either its closed or open positions irrespective of temperature conditions at the thermal element.

Another object of the invention is to provide a control device, such as a valve, operated by a thermal responsive element and a spring opposing the thermal element, and having a new and improved mechanism, including a manually movable member for adjusting the spring tension over a relatively wide range to vary the valve operating temperatures, which mechanism includes a resilient member arranged to counteract reaction of the spring on the manually movable member so that the effort required to manually adjust the spring is nominal and substantially constant throughout the range of the spring adjustment.

Still another object of the invention is to provide a thermal responsive control device, such as a valve having a spring to control the temperatures at which the valve operates, the tension of which is adjustable by new and improved mechanism which has relatively few parts and which parts are inexpensive to manufacture and can be readily assembled into a compact mechanism which requires but slight effort in effecting considerable adjustment in the tension of the spring.

Other objects and advantages of the invention will be apparent from the following description of a preferred form of the invention, reference being had to the accompanying drawings wherein Fig. 1 is a sectional view of a valve mechanism having a thermally responsive element to operate the valve and a manual adjustment for adjusting the temperatures at which the valve is operated;

It has become a practice to provide heating systems for the passenger compartments of automobiles which systems include provisions for circulating the hot coolant from the automobile engine through a radiator arranged to heat air for the compartment. Thermostatically operated valves have been provided to control the circulation of the coolant through the radiator in accordance with the air temperature within the compartment, and manual adjustment means have been provided in such control valve mechanisms by which the average temperature in the compartment can be regulated to suit the occupant of the automobile.

One form of control valve includes a thermal responsive element comprising a hollow expansible device having a highly volatile fluid therein which changes in vapor pressure and causes expansion and contraction of the device according to rise and fall in temperature. A spring sometimes referred to as a "range spring," is arranged to mechanically oppose the expansible device and tends to open the valve as the pressure in the device decreases, hence by adjusting the tension of the spring, the temperature at which the valve operates can be varied. It is desirable to provide a hand operated member, such as a push-pull button, for effecting adjustment of the spring and difficulty has been experienced in providing a spring adjusting mechanism which can be easily operated by a push-pull knob and which will hold the spring adjustment in any position the hand knob is set.

The present invention contemplates a control valve of the type described, having a new and improved mechanism for adjusting the range spring tension, and the invention comprises providing a pivoted member which is connected to the valve control spring by an element pivotally connected thereto at a point eccentric to the pivot of the member and which element is moved to change the length of the spring when the member is rotated about its pivot. In the preferred form of the invention, the member is rotated by a push-pull knob. A counteracting spring is attached to the adjusting member to urge the latter in a direction counter to the reaction of the range spring on the adjusting member, and the point of connection between the counteracting spring and the adjusting member is such that the leverage advantage of the counteracting spring is increased as the adjusting member is moved to increase the tension of the range spring.

The invention further contemplates the provision of a valve operating lever adapted to be engaged on one side by the adjusting member when the member is moved to one position to force and hold the valve in the open position, and to be engaged on its opposite side by the adjusting member when the latter is moved to another position to positively hold the valve in the closed position whereby the valve may be maintained in either the open or closed position irrespective of the temperatures effecting the thermal responsive element, if desired.

Figure 1:
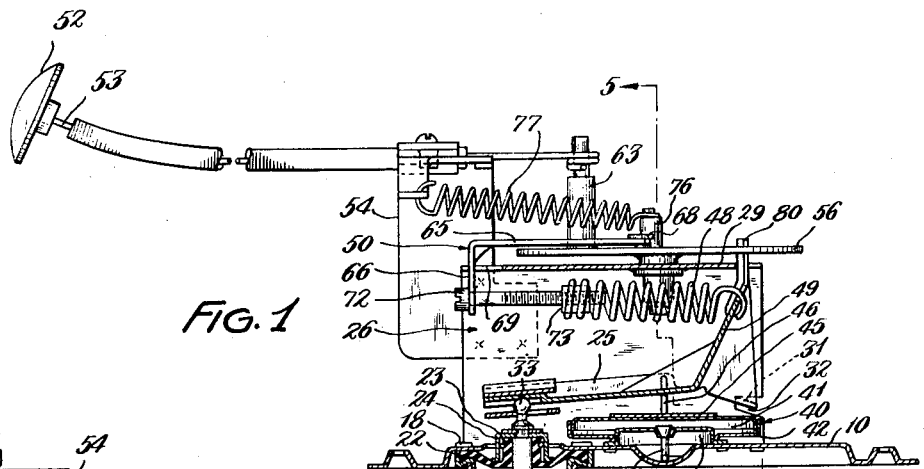

Although the invention is susceptible of use in control mechanisms for a variety of purposes, it is particularly suitable for use in control valves for automotive heating systems such as that described and it is herein shown embodied in such type valve. Referring to the drawings the control valve comprises a mounting or base plate 10 having a valve chamber 11 attached to one side thereof. The valve chamber comprises a tubular member 12 having a tube 13 connected in one side as by brazing and opening thereinto to form an inlet. The upper end of the tubular member 12 as viewed in Fig. 1 is brazed to an end plate 16 which has a circular boss projecting into the tubular member and which boss has a central opening. The end plate is provided with four lugs 18, only two of which appear in the drawings, and which extend through slots in the plate 10 and are crimped to secure the end plate 16 to the plate 10.

An annular valve seat 19 is brazed inside the tubular member 12 and a valve member 20, attached to a valve rod 21, is adapted to cooperate with the valve seat. The rod 21 extends through the valve seat 19, opening in plate 16 and outwardly through an opening in the mounting plate 10 in registration with the tubular member 12. A flexible fluid tight seal is effected between the rod 21 and walls of tubular member 12 by a flexible diaphragm 22, which is preferably formed of neoprene or a similar material, clamped about its edges between the end plate 16 and the mounting plate 10. The central portion of the diaphragm has a neck 23 through which the valve rod 21 extends and which neck portion is clamped to the rod. Preferably, a cap 24 is secured over the neck 23.

The valve rod 21 is operated by a lever 25 which is pivoted on a housing 26 attached to base plate 10 and which comprises a U-shaped sheet metal member having side walls 27, 28, interconnected by a top wall 29. The lever 25 has two laterally extending lugs 31, which engage in V notches 32 formed on opposite sides of the housing 26, only one of which lugs and notches appear in the drawings. The outer end of valve rod 21 has a ball 33 formed thereon and is maintained in engagement with the under side of lever 25 by a C-shaped spring 35, the upper side of which engages the top side of lever 25 and the under side of which is slotted to receive the neck portion on the rod 21 immediately below the ball 33. It will be seen that the spring 35 resiliently maintains the rod 21 in engagement with the lever 25. The ball formation minimizes the friction between the lever and rod and permits the rod to shift to seat the valve, if necessary.

The lever 25 is adapted to be moved to close the valve by a thermal responsive element 40 which is attached to the plate 10 and is adapted to rotate the lever 25 clock-wise. In the preferred form of the invention, the thermal responsive element 40 comprises a pair of dish shaped flexible members 41, 42 having the edges thereof telescoped and hermetically joined to form an expansible chamber. Member 42 has a cup shaped member 43 brazed thereto which is attached to the base plate and which has one end of a tube 44 connected therewith leading to the interior of members 41, 42. The opposite end of the tube is closed. The tube 44 preferably is of such length that a substantial part thereof may be disposed in the area the temperature of which is to be controlled, and the tube and the expansible chamber contains a gas such as methyl chloride, for example, the pressure of which corresponds to the temperature at the coolest portion of the thermal responsive element. The member 41 has a plate 45 attached thereto, which plate carries two lugs 46, which lugs engage the under side of the lever 25 and which preferably have projections which extend through openings in the lever to maintain the lever centered thereon. As the gas pressure within the thermal responsive element 40 increases, the lever 25 is urged clock-wise to close valve 20 on its seat 19. Preferably, clock-wise movement of the lever 25 is limited by a lug 47 stamped from the wall 27 and turned inwardly.

The lever 25 is urged counterclock-wise to open valve 20 by a spring 48 which is attached at one end to an upwardly projecting leg 49 of the lever and the other end of which is attached to an element 50 of a spring adjusting mechanism. It will be understood by those skilled in the art that on an increase in temperature of the gas in the thermal responsive element 40, the element tends to move the valve to the closed position and on a decrease in temperature the spring tends to move the valve to open position. By adjusting the tension of the spring the temperatures at which the valve opens and closes can be regulated.

The range spring adjusting mechanism includes a push-pull knob 52 which may be disposed in any convenient position and when the valve is used in an automobile, it may be mounted on the dashboard. The knob 52 is attached to a Bowden wire 53 which is preferably incased in a flexible cable, one end of which is secured to the control mechanism by a bracket 54 welded to the housing 26 and which has a screw clamp 55 for attaching the cable to the bracket.

An adjusting member 56 is pivotally attached to the housing wall 29 and it comprises an elongated plate having a pin 58 welded to the underside thereof which extends through an opening in the housing wall and through a bushing 59 welded to the underside of the wall. The pin 58 is held in the bushing 59 by a spring ring 60 secured in a groove about the lower end thereof. The adjusting member 56 has a post 63 attached thereto adjacent to one end to which the wire 53 is connected so that member 56 is rotated when the knob 52 is pushed or pulled.

The adjusting member 56 is connected with the spring 48 through the element 50 which comprises a plate having a leg 65 and a laterally extending foot portion 66. The free end of leg 65 has a semicircular recess 67 which engages a pin 68 attached to the upper surface of the member 56 and which pin is located eccentric to the pivot pin 58. The top wall of the housing has a recess 69 through which the foot 66 of the element 50 extends downwardly into the housing. The foot 66 has a notch 70 which receives an edge portion of housing wall 29 at one side of recess 69 for supporting leg 65 in alignment with pin 68. It will be seen that the edges of the recess 69 form a guide for the outer end of the element 50 so that when the adjusting member 56 is rotated, the outer end of the element moves longitudinally relative to the spring 48.

Figure 2:
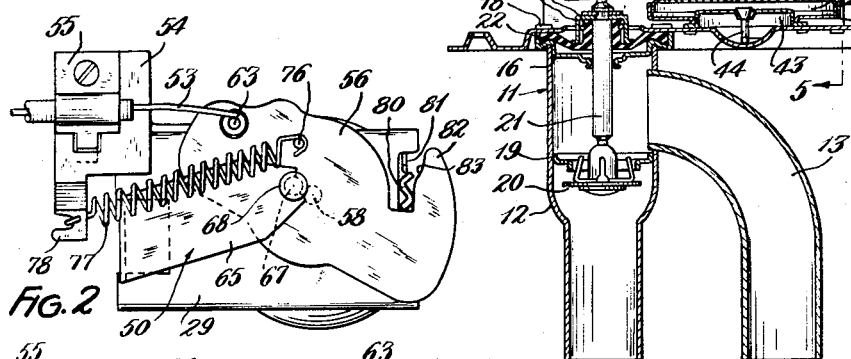
Fig. 2 is an elevational plan view of the valve mechanism showing certain parts of the valve mechanism in position to hold the valve open, certain other parts of the mechanism being omitted for the sake of clarity.
Figure 3:
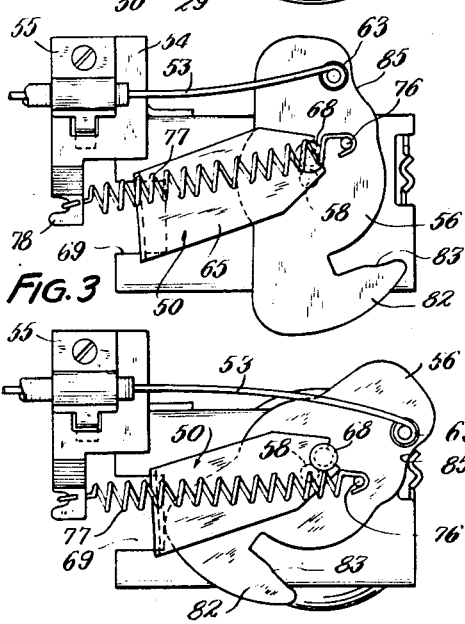
Fig. 3 is a view similar to Fig. 2 but showing the spring adjusting mechanism in an intermediate adjustment position.

The foot 66 of the element 50 has a screw 72 rotatably supported in an opening therethrough and the screw has a nut 73 having external threads for receiving and securing one end of the spring 48 thereto. By rotating screw 72 an initial tension on spring 48 may be provided to establish the range of temperature in which the valve is to operate. It will be seen that by rotating member 56, the length of spring 48 can be varied through element 50, consequently varying the tension thereof on lever 25. It will be appreciated that the tension of spring 48 maintains element 50 against the pin 58 and it also tends to rotate the adjusting member 56 clockwise as viewed in Fig. 2.

By providing the slot and pin connection between element 50 and member 56 and the recess guide 69 for element 50, the assembly of the mechanism is greatly facilitated as the element may be slipped in place and it is secured by the tension of the range spring thereon.

Figure 7:
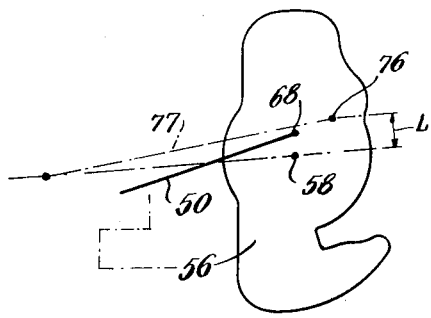
Figs. 7 and 8 are diagrammatic illustrations of the spring adjusting mechanism in two different positions.
Figure 8:
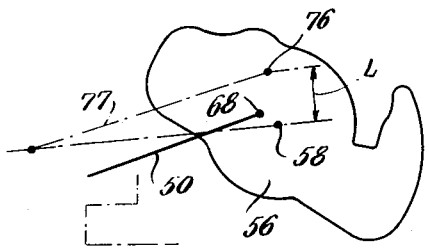

To counteract the tendency of spring 48 to rotate the adjusting member 56, a pin 76 is attached to the upper side of the adjusting member and a tension spring 77 is attached to the pin. The opposite end of the spring 77 is attached to a hook portion 78 of the bracket 54 and the spring 77 tends to rotate member 56 counterclock-wise and against the reaction of spring 48. The location of pin 76 relative to pin 68 is such that as the element 50 is moved by rotation of member 56 to increase the tension of spring 48, i. e., counterclock-wise, the leverage advantage of spring 77 on member 56 increases thereby compensating for the increased reaction of spring 48 on member 56. It will be seen that at the same time the leverage advantage of spring 48 against member 56 decreases. This change in lever advantage of spring 77 on member 56 is illustrated by the line L in Figs. 7, 8 which line is normal to a line running through the pivot of member 56 and the connection of spring 77 with the hook 78. In Fig. 8 it will be seen that the line L is at approximately its maximum length while element 50 is at approximately its maximum travel in a direction to increase tension of spring 48. In Fig. 7 the line L is considerably shorter and the leverage advantage of spring 77 on member 56 is decreased while element 50 is intermediate its spring adjusting travel. Thus, by properly selecting the characteristics of spring 77 the adjusting member 56 may be rotated with a minimum of effort and it will remain in any position it is placed. It is apparent that the eccentricity and angular displacement of pin 68 relative to pin 58 determines the rate of adjustment of spring 48 according to angular movements of the member 56, and this may be varied as desired.

Figure 10:
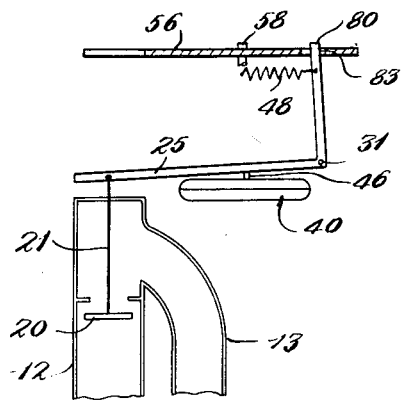

To hold the valve in either of its open or closed positions, the upwardly extending portion 49 of the lever 25 has a lug 80 formed thereon which projects upwardly through a notch 81 in the housing wall 29. One end of the adjusting member 56 is provided with a hook portion 82 which is adapted to engage the lug 80 when the member 56 is rotated counterclock-wise to the position shown in Fig. 2 and to thereby force the lever 25 counterclock-wise as shown in Figs. 1 and 10. The valve is thus maintained open irrespective of the temperatures affecting the thermal responsive element 40. The hook portion 82 has a surface 83 which is adapted to cam the lug 80 to the valve opening position in the event the valve is in its closed or almost closed position when the adjusting member 56 is moved to position shown in Fig. 2.

Figure 4:
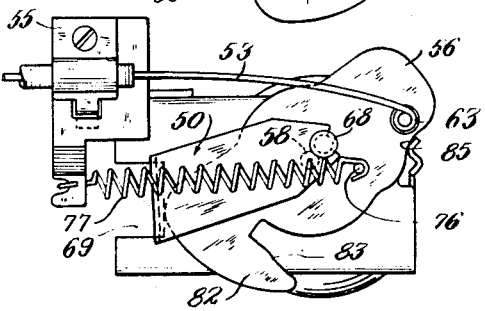
Fig. 4 is a view similar to Fig. 2 but showing the spring adjusting mechanism in a position to maintain the valve in the closed position.
Figures 5, 6:
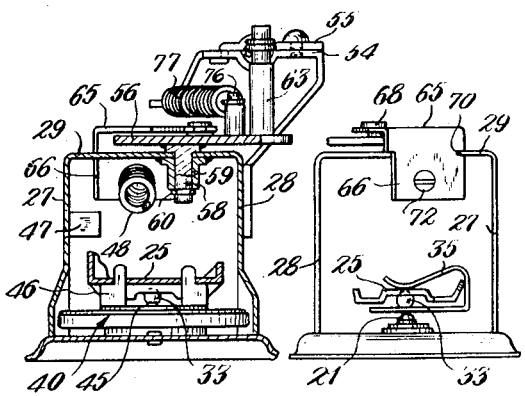
Fig. 5 is a sectional view taken substantially along line 5—5 of Fig. 1.
Fig. 6 is a fragmentary elevational end view of the control valve mechanism.
Figure 9:
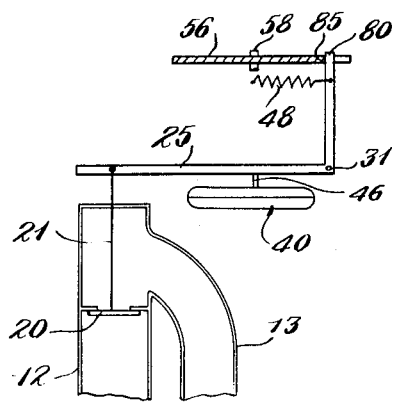
Figs. 9 and 10 are diagrammatic illustrations of the valve mechanism moved to its open and closed positions by the manual adjusting mechanism.

The opposite end of member 56 is provided with a cam formation 85 which engages the lug 80 when member 56 is rotated clock-wise to position shown in Fig. 4. The cam surface 85 is adapted to move the lug 80 outwardly and consequently rotate lever 28 clock-wise to close the valve 20 on its seat 19, irrespective of the temperature conditions prevailing at the thermal responsive element, as seen in Fig. 9.

It will be seen that by my invention, I have provided a manual adjusting mechanism for the temperature regulating spring of a control device whereby the spring may be adjusted over a wide range with a minimum of effort. The parts are so arranged that they may be formed inexpensively and the assembly thereof into the completed mechanism is convenient and may be carried out with considerable efficiency. While the invention has been shown and described as embodied in a valve, it could be embodied in a thermostatically operated electric switching mechanism as well in which the range spring could control the temperatures at which the switch, rather than a valve, is opened and closed. In using the term "valve" herein, it is to be understood that electric switches are included.

Although only one form of the invention has been shown and described, it is to be understood that other forms might be adopted as falling within the purview of the invention.

Having thus described my invention, I claim:

1. In a thermostatically actuated device, a lever movable to actuate a control member, a thermal repsonsive element for moving said lever, a spring opposing said element to control the temperatures at which said lever is operated, and means for adjusting the tension of said spring comprising a pivoted member, means linking said pivoted member and spring to vary the length of said spring by rotation of said pivoted member on its pivot, said lever having a portion thereof extending into the plane of rotation of said pivoted member, said pivoted member having a part in the form of a cam adapted to engage one side of said portion to positively hold said lever in one position when said pivoted member is rotated to a first position and having a part in the form of a second cam adapted to engage the opposite side of said portion to positively hold said lever in another position when said pivoted member is rotated to a second position.

2. In a thermostatically actuated device, a housing, a lever movable to actuate a control member, a thermal responsive element for moving said lever, a spring opposing said element to control the temperatures at which the control member is operated, means for adjusting the tension of said spring comprising a member pivoted to a wall of said housing, a link pivotally connected at one end to said pivoted member eccentric to the axis of rotation of said member and connected at the opposite end thereof to said spring, said housing wall having a recess receiving a part of said link whereby edges of said recess form a guide for said link substantially longitudinally of said spring when said pivoted member is rotated on its pivot.

3. A thermostatically actuated control device as defined in claim 2 in which the pivotal connection between said link and pivoted member comprises a pin and notch.

4. A thermostatically operated control device as defined in claim 2 in which the pivotal connection between said link and pivoted member comprises a pin on said pivoted member and a recess in said link receiving said pin.

5. In a thermostatically actuated device, such as a valve having a spring adapted to regulate the temperatures at which the valve is operated according to the tension of said spring, means for varying the tension of said spring, comprising, a rotatable member, a link connected with said spring and movable to vary the tension of said spring, said link being pivotally connected with said member eccentric to the axis of rotation of said member and adapted to be moved to vary the tension of said spring when said member is rotated, and a resilient member connected to said rotatable member at a point eccentric to the axis of said member and located relative to the pivotal connection between said link and rotatable member to urge said rotatable member in a direction contra to the reaction of said spring on said rotatable member through said link during at least a portion of the range of rotation of said member and to increase the leverage advantage of said resilient member on said rotatable member as the latter member is moved to increase the tension of said spring through said link.

6. In a thermostatically actuated device, such as a valve having a spring adapted to regulate the temperatures at which the valve is operated according to the tension of said spring, means for varying the tension of said spring comprising, a pivoted member, a link connected with said spring and movable to vary the tension of said spring, said link being pivotally connected with said member eccentric to the axis of rotation of said member, guide means for directing movement of said link longitudinally of said spring when said member is rotated, and a resilient member connected to said pivoted member at a point eccentric to the axis of said pivoted member and located relative to the pivotal connection between said link and member to urge said pivoted member in a direction contra to the reaction of said spring on said pivoted member through said link during at least a portion of the range of rotation of said member and to increase the leverage advantage of said resilient member on said pivoted member as said pivoted member is moved to increase the tension of said spring through said link.

ESTEL COLER RANEY.

REFERENCES CITED

The following references are of record in the file of this patent:

UNITED STATES PATENTS

| Number | Name | Date |
| --- | --- | --- |
| 1,847,911 | Trane | Mar. 1, 1932 |
| 2,129,937 | Johnson | Sept. 13, 1938 |
| 2,332,556 | Breese | Oct. 26, 1943 |
| 2,341,785 | Johnson | Feb. 15, 1944 |
| 2,487,438 | Gryce | Nov. 8, 1949 |
| 2,537,315 | Newton | Jan. 9, 1951 |